:::: {.columns}
::: {.col}
United States Patent [19]

Ames

[54] METHODS FOR STORING COOLNESS CAPACITY

[75] Inventor: Douglas A. Ames, Huntington Beach, Calif.

[73] Assignee: Transphase Systems, Inc., Huntington Beach, Calif.

[21] Appl. No.: 338,534

[22] Filed: Apr. 11, 1989

Related U.S. Application Data

[63] Continuation of Ser. No. 126,505, Nov. 30, 1987, abandoned.

[51] Int. Cl.$^5$ .................................................. C09K 5/00
[52] U.S. Cl. ............................................ 52/70; 165/10
[58] Field of Search ............................ 252/70; 165/10

[56] References Cited

U.S. PATENT DOCUMENTS

| | | | |
|---|---|---|---|
| 4,244,148 | 4/1981 | Chabanon et al. | 252/70 |
| 4,342,661 | 8/1982 | Ehlers et al. | 252/70 |
| 4,349,446 | 9/1982 | Marks | 252/70 |

:::
::: {.col}

[11] Patent Number: 5,037,571

[45] Date of Patent: Aug. 6, 1991

FOREIGN PATENT DOCUMENTS

| | | | |
|---|---|---|---|
| 3431978 | 3/1986 | Fed. Rep. of Germany | 252/70 |
| 2539139 | 7/1984 | France . | |
| 83/01956 | 6/1983 | World Int. Prop. O. | 252/70 |

OTHER PUBLICATIONS

Stecher, Ed. *The Merck Index*, 8th Ed., 1968, p. 960.

*Primary Examiner*—Paul Lieberman
*Assistant Examiner*—Christine A. Skane
*Attorney, Agent, or Firm*—Watson, Cole, Grindle & Watson

[57] ABSTRACT

Sodium hydroxide-water solutions that have freezing-melting point plateaus below 46° F. can be used to store cooling capacity by their heat of fusion, and compositions that freeze at about 41° F. are suitable, particularly when nucleating agents such as sodium dichromate and dispersing agents such as a clay, are also used.

4 Claims, No Drawings

:::
::::

METHODS FOR STORING COOLNESS CAPACITY

This application is a continuation of application Ser. No. 126,505, filed 11/30/887, now abandoned.

This invention relates in general to the utilization of the heat of fusion of a frozen liquid to store cooling capacity so that a liquid or gas to be chilled can be brought into heat transfer relationship with the frozen liquid. As the frozen liquid melts, heat is taken from the fluid to be chilled, and the temperature of that material is lowered.

BACKGROUND OF THE INVENTION

It has now generally been recognized that while heat generated during daylight hours can be stored by various means and used when the heat of the sun is insufficient to maintain a desired temperature and heat energy must be provided by other means, such as the burning of fossil fuels, there is also a definite need for storing what might be considered cooling capacity. By the use of that term I refer to heat energy stored at temperatures substantially lower than room temperature, i.e., 70° F. Thus, the present invention is most specifically directed to the storage of cooling capacity, and particularly such storage due to a change of phase of the storage composition from liquid to solid.

Perhaps the most common forms of cooling capacity storage on a commercial scale are the utilization of chilled water storage or ice storage. Chilled water storage is accomplished by chilling water at off-peak hours, for example, during the night and early morning when the consumption of electricity is less and electricity rates are therefore lower, and then utilizing that chilled water to air condition a building during peak periods when time-of-use electricity rates are higher.

Chilled water storage, however, presents some important problems, although it has achieved a measure of commercial utility. Among those problems is that a great deal of space is required to be occupied by the chilled water, which is generally stored in tanks. Since the chilled water maintains its cooling capacity solely by the specific heat of the water, i.e., there is no change of phase during which coolness capacity can be stored, large volumes of water are necessary in order to effect any substantial chilling capacity. Large volumes of chilled water require storage tanks with large volumes. Moreover, accommodating the return flow of chilled water the coolness capacity of which has been utilized in order to air condition a building, presents a still additional storage requirement. After its cooling capacity has been so used, the chilled water, now at a substantially higher temperature, is returned, presumably to the tank in which it was originally stored. In this case some means must be provided to thermally separate the returning, warmed water from chilled water still in the tank, or the warmed water must be separately stored in a tank that is not in heat transfer relation with the original chilled water storage tank. It has thus become recognized that while chilled water storage may not be exceptionally difficult to accomplish, it has infirmities of space that severely limit its economic viability.

In order to overcome the weaknesses of chilled water storage, ice storage has long been considered a possible viable alternative. Thus, air conditioning of a building, such as a church, which is used for relatively short periods of time, by means of ice is not a new practice. Yet, while the excessive storage volume problems that are attendant with chilled water storage are not present with ice storage, the latter presents problems of its own. For example, ice storage systems, which may be of various constructions, are generally established above grade and occupy space that is valuable for other applications. In chilled water storage the tanks for the chilled water may be located below grade, so that they will underlie facilities at ground level, e.g., a parking lot or lawn. Ice storage units are often located above grade and so occupy valuable space usable for other purposes, besides being visually unattractive. In addition, freezing water at 32° F. requires low-temperature refrigeration equipment. It will be apparent that more compressor energy is necessary to freeze water at 32° F. than to freeze materials at higher temperatures and that the energy required exceeds that on a straight-line basis. There are other problems with ice storage, such as the fact that water expands as it freezes, thereby subjecting to undesirable stresses any containers for water to be frozen.

That type of coolness storage system which appears to hold greatest promise for commercial utilization is one which is of more recent advent and is now effecting penetration into the marketplace. That type of system is generally referred to as one making use of phase change materials, which have a freezing and melting point above 32° F. and which do not have a substantial change of density when they transmute between solid and liquid phases. In this manner such phase change materials, or PCM's, can be frozen to a solid during off-peak hours, then utilized for their heat of fusion, as well as specific heat, during peak hours. Among such PCM's are those based on Glauber's salt, modified by the addition of other salts in order to obtain the requisite freezing point.

In my U.S. Pat. No. 4,689,164, issued Aug. 25, 1987 and assigned commonly herewith, I have disclosed an improved phase change material based on Glauber's salt, i.e., sodium sulfate decahydrate, in which there is a ratio of potassium chloride and ammonium chloride such that the resulting salt has a eutectoid point, or freezing-melting point, of about 47°-48° F. While such sodium sulfate-based PCM has achieved a place in the market, in practicality I have found it impossible, at least up to this time, to devise a Glauber's salt-based PCM that has a freezing-melting point plateau of less than 47° F. Yet such a lower freezing point would appear highly advantageous, since chillers used to produce cold water for bringing the temperature of PCM's below their freezing point have now progressed to a degree where they can easily produce water in a 35°-38° F. range or lower. As a consequence, it is presently highly desirable to find a PCM that has a freezing point below 47° F., because colder water is sometimes required for dehumidification.

While phase change materials based on Glauber's salt occupy perhaps one-fourth to one-third of the volume required for chilled water storage, and while they do not have the problem of segregating the return flow of warmed water after it has been utilized as a coolant for air conditioning a building, PCM's do have an economic disadvantage when compared with water, for example. While sodium sulfate-based phase change materials as disclosed in my U.S Pat. No. 4,689,164 tend to mitigate those difficulties, cost does play an important role and Glauber's salt-based PCM's are not inexpensive. Considering that a three-year payback is at times almost an unwritten rule of whether a PCM-based coolness storage system will be utilized in a new building, the PCM art is dependent on cost cutting improvements for its economic survival, and it is necessary to determine further means by which the cost of such PCM's can be reduced.

As stated above, I am aware of no sodium sulfate-based PCM that can be adjusted to a freezing point substantially less than 47° F. This is not only a problem in regard to such lower temperatures, but one that is endemic to the use of PCM's in general. PCM's do not appear to freeze and melt at a point that can be easily adjusted. Thus, in my patented composition, the PCM there disclosed freezes and melts at about 47° F., perhaps over a range or plateau from 46.5° to 48° F. Yet changes in materials utilized do not permit the adjustment of the freezing-melting point to 45° F. or to 50° F. Apparently any specific combination of salts form a phase diagram that has one or more peritectic (or eutectoid) points, and the Glauber's salt phase diagram with potassium chloride and ammonium chloride has a eutectoid point at 47° F. A change in amounts of ingredients that might make it appear that such composition would freeze, e.g., at 50° F. will not only not freeze at that temperature, but will form a slush that will not freeze solid over a wide range of temperatures. Also, such PCM's may melt incongruently and require shallow containers. Thus, it is particularly desirable to formulate other PCM's that will freeze at other desirable temperatures.

As a consequence, it is a principal object of the present invention to provide a phase change material that will freeze and melt at a temperature below 47° F. but above 32° F., and most preferably at approximately 40° F. to 42° F.

Another primary object is to formulate an inorganic composition for use as a phase change material, which composition will be less expensive per unit of coolness stored than the salts that make up a Glauber's salt-based PCM for coolness storage, and which will have a relatively high heat of fusion when compared to Glauber's salt-based compositions. Such inorganic compositions should be in plentiful supply and have a high product density as well.

While the ideal formulation has yet to be discovered, it is believed that the invention disclosed herein represents a major effort in reaching these objectives and that, particularly where I disclose the use of an inorganic composition that melts and freezes at approximately 41° F., this is an important complement sodium sulfate-based PCM's that freeze at 47° F. and represents a pioneer step forward in the art.

SUMMARY OF THE INVENTION

The present invention takes both method and composition forms. As a method it is based on providing a sodium hydroxide-water solution having a defined freezing point plateau below 47° F., freezing the solution, and circulating a fluid to be cooled into the vicinity of the frozen solution to transfer heat from the fluid to the frozen solution until the fluid has been cooled to a predetermined temperature. Preferably the freezing point plateau is at about 41° F. Generally the fluid to be cooled is a liquid, such as water, which is circulated in proximity to the frozen solution and then passed through a building to be cooled, i.e., air-conditioned.

A composition suitable for storing cooling capacity by its heat of fusion has a freezing-melting point plateau at about 41° F. and comprises a sodium hydroxide-water solution in which the ratio of NaOH to water is about 46 to 54, and a nucleating agent in an amount sufficient to inhibit supercooling of the solution. To inhibit supercooling the agent, which is sodium dichromate or chromate, should be present in an amount in excess of its solubility in the solution, which is generally about 3% by weight.

The composition also preferably includes a dispersing agent in a quantity sufficient to maintain the nucleating agent in dispersion throughout the solution. More preferably the dispersing agent is a thickener, such as a finely divided clay, e.g., attapulgite clay. In this form of my invention the chromate or dichromate is present in about 6% by weight of the solution, is held in suspension in the solution, and inhibits supercooling to a temperature substantially below the freezing point plateau.

DETAILED DESCRIPTION OF THE INVENTION

In my experimentation with NaOH-$H_2O$ solutions the only substantially plateau-like temperatures encountered for solidification between 32° F. and 47° F. was at about 41° F. Yet at that temperature supercooling was a problem that was not solved with, e.g., KOH, clay, graphite or charcoal. Such supercooling was alleviated by the use of sodium dichromate preferably, or sodium chromate. It was found, however, that the amount of chromate present must exceed its solubility, since otherwise the chromate molecule, which apparently has a desirable crystalline shape, remains in solution and does not act to seed the solution. The percent by weight of chromate above which all the chromate will not be soluble is about 3%, so that maintaining about 4% chromate or dichromate in the solution is sufficient to ensure that there will be some insoluble seeding material in crystalline form. For reasons not known, the dichromate appears to produce a sharper freezing-melting point plateau.

Such freezing-melting point plateau for a sodium hydroxide-water solution has been found to stabilize at about 41° F. When such temperature is referred to, it will be understood that there is no sharp melt/freeze point, but a range of perhaps 1°–2° F. over which freezing or melting occurs. Of course, the sharper the melt/freeze point and the harder the freeze the better. Thus, when referring to a freezing point of about 41° F. it is often about 40.0° F. to 42° F.

While the nucleating agent may be sufficient without a dispersing agent, and sodium hydroxide solutions are reported to melt congruently, it has been found advantageous to use a dispersing agent to ensure that the chromate is evenly dispersed throughout the solution. Such use may raise the melting point slightly. Since the chromate is in solid form when it exceeds its solubility in the solution, in order to keep it dispersed a thickening agent, preferably a finely divided clay such as bentonite, diatomaceous earth, kaolin or attapulgite clay, with the last mentioned being preferred at this time, may be used. However, clay has not been effective in preventing supercooling. The amount of clay used is that sufficient to keep the chromate in suspension, e.g., approximately 6% to 7% by weight of the solution, although the quantity is not critical so long as it is sufficient to perform its function.

Having thus described my invention in detail, the preferred mode of my invention for the 41° F. freezing-melting point plateau material is: NaOH-42%; $H_2O$-49%, $Na_2Cr_2O_7 \cdot 2H_2O$-3%, and attapulgite clay-6%, all parts being by weight. Without supercooling prevention, the preferred ratio by weight of the 41° F. material is about 46 to 54.

After such compositions have been prepared, containers are filled with them in a manner well known in the art, and the containers are stacked in a tank so that water can circulate freely about them. Chilled water can then be used to freeze the containerized compositions in a charge cycle during off-peak hours, and the frozen containers of the composition used to chill water during peak hours. Such chilled water is thereafter circulated throughout and serves as a means for air-conditioning a building.

It will be apparent seen that while my invention has been described with reference to a preferred embodiment, certain modifications and alterations therein will be obvious to those of skill in this art. As to all such modifications and alterations, it is desired that they be included within the purview of the present invention, which is to be limited only by the scope, including equivalents, of the following, appended claims.

I claim:

1. A method of storing cooling capacity at temperatures below 41° F. using frozen sodium hydroxide-water solutions as the storage medium and thereafter utilizing said stored cooling capacity to cool a fluid to a predetermined temperature, comprising
   (a) providing a sodium hydroxide-water solution in which the ratio of sodium hydroxide to water is about 47 to 53 and having a defined freezing point plateau below 41° F.;
   (b) lowering the temperature of said solution to its freezing point plateau to freeze said solution;
   (c) providing a fluid to be cooled, and
   (d) circulating said fluid in the vicinity of said frozen solution to transfer heat from said fluid to said frozen solution and melt at least a portion of said frozen solution until said fluid has been cooled to said predetermined temperature.

2. A method of storing cooling capacity as claimed in claim 1, in which said sodium hydroxide-water solution is containerized prior to freezing.

3. A method of storing cooling capacity as claimed in claim 1, in which said fluid is a liquid and said predetermined temperature to which said liquid has been cooled is at the melting point of said frozen solution.

4. A method of storing cooling capacity as claimed in claim 2, in which said fluid is water which, after being cooled to said predetermined temperature, is circulated through a building to assist in cooling the air therein.

* * * * *

UNITED STATES PATENT AND TRADEMARK OFFICE
CERTIFICATE OF CORRECTION

PATENT NO. : 5,037,571

DATED : August 6, 1991

INVENTOR(S) : Douglas A. Ames

It is certified that error appears in the above-identified patent and that said Letters Patent is hereby corrected as shown below:

On the title page in the Abstract:
    Line 2, change "46°F" to --47°F--.

Column 1, line 5, change "11/30/887" to --11/30/87--.

Column 4, line 2, change "46 to 54" to --47 to 53--.
         line 47, change "42°F" to --42.0°F--.

Column 5, line 3, change "46 to 54" to --47 to 53--.
         line 25, (claim 1) change "below 41°F" to --of about 41°F--.

Column 6, line 5, (claim 1) change "47 to 53" to --47 to 53--.
         line 6, (claim 1) change "below 41°F" to --at about 41°F"--.

Signed and Sealed this

Fifteenth Day of December, 1992

Attest:

DOUGLAS B. COMER

*Attesting Officer*        *Acting Commissioner of Patents and Trademarks*